US007299557B2

(12) United States Patent
Lippuner

(10) Patent No.: US 7,299,557 B2
(45) Date of Patent: Nov. 27, 2007

(54) TILT SENSOR

(75) Inventor: Heinz Lippuner, Rebstein (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 11/179,231

(22) Filed: Jul. 12, 2005

(65) Prior Publication Data

US 2006/0005407 A1    Jan. 12, 2006

(30) Foreign Application Priority Data

Jul. 12, 2004  (DE) ............... 20 2004 010 922 U

(51) Int. Cl.
*G01C 9/06* (2006.01)
(52) U.S. Cl. ............... 33/366.16; 33/366.12; 33/377; 356/249
(58) Field of Classification Search ........ 33/366.23, 33/366.12, 366.15, 366.16, 1 L, 1 N, 281, 33/283, 377; 356/138, 148, 149, 248, 249; 359/665, 832
See application file for complete search history.

(56) References Cited

U.S. PATENT DOCUMENTS

| | | | | |
|---|---|---|---|---|
| 3,958,883 A * | 5/1976 | Turner | ............ | 356/316 |
| 4,330,212 A * | 5/1982 | Miller | ............ | 356/508 |
| 4,391,683 A * | 7/1983 | Buckley et al. | ............ | 205/655 |
| 4,797,179 A * | 1/1989 | Watson et al. | ............ | 438/29 |
| 4,867,371 A * | 9/1989 | Davis et al. | ............ | 228/160 |
| 5,231,536 A * | 7/1993 | Wilt et al. | ............ | 359/436 |
| 5,371,951 A * | 12/1994 | Piske | ............ | 33/366.12 |
| 5,463,649 A * | 10/1995 | Ashby et al. | ............ | 372/40 |
| 5,828,447 A * | 10/1998 | Duchon et al. | ............ | 356/152.1 |
| 5,852,304 A * | 12/1998 | Suzuki et al. | ............ | 257/17 |
| 5,893,215 A * | 4/1999 | Kumagai et al. | ............ | 33/366.16 |
| 6,088,377 A * | 7/2000 | Matsuda | ............ | 372/50.12 |
| 6,320,653 B1 * | 11/2001 | Feist | ............ | 356/139.1 |
| 6,488,392 B1 * | 12/2002 | Lu | ............ | 362/308 |
| 6,900,777 B1 * | 5/2005 | Hebert et al. | ............ | 345/7 |
| 2002/0027650 A1 * | 3/2002 | Yamamoto et al. | ............ | 356/121 |
| 2007/0109655 A1 * | 5/2007 | Kalyanasundaram et al. | ............ | 359/619 |

FOREIGN PATENT DOCUMENTS

| | | |
|---|---|---|
| DE | 19621189 A1 | 11/1997 |
| DE | 69219183 T2 | 1/1998 |
| DE | 19610941 C2 | 10/1998 |
| WO | WO 2004/038285 | 5/2004 |

* cited by examiner

*Primary Examiner*—R. Alexander Smith
(74) *Attorney, Agent, or Firm*—John K. McCulloch

(57) ABSTRACT

A tilt sensor has a source for optical radiation, a pattern support having an optically effective pattern for the passage of the optical radiation generated by the source, a tilt-sensitive unit downstream of the pattern support in the direction of propagation of the radiation, and a projection area for the incidence of the radiation generated by the source and passing through the pattern support and the tilt-sensitive unit, wherein the source is in the form of a pattern support.

14 Claims, 2 Drawing Sheets

TILT SENSOR

The invention relates to a tilt sensor especially adapted for use in levelling surveying instruments.

BACKGROUND OF THE INVENTION

Tilt and optionally angle sensors are used, for example, for levelling geodetic measuring instruments in surveying. EP 0 507 102 B1, corresponding to U.S. Pat. No. 5,371,951A, describes an inclinometer in which the light source and pattern support are present as two separate components and are arranged a distance apart. The tilt-sensitive unit is regarded as being a liquid prism which results in the deflection of the light beam in a manner known per se, depending on the angle at which a light beam is incident on the liquid surface. The pattern has a herringbone form and consists of spaced V-shaped lines which are arranged parallel to one another and may optionally be either of the same or of different line thickness. A disadvantage of this arrangement is that the separate presence of light source and pattern support entails more material and a greater constructive effort and requires more space.

SUMMARY OF THE INVENTION

It is therefore an object of the invention to eliminate deficiencies of the prior art and to provide a tilt and angle sensor of compact design in which the light source carries a pattern and thus simultaneously serves as a pattern support. This object is achieved by an apparatus having light-emitting diodes or other—extensive—light generators which generate electromagnetic radiation from electric current and do not operate according to the semiconductor principle. Suitable light sources may be, for example, incandescent lamps, fluorescent lamps or the like. An advantage of the invention is that at least one component less is required in comparison with the inclinometers to date, which makes it possible to reduce the production costs and permits a shortened design. A further advantage arises out of the omission of the collimation of the light beam before striking the pattern, which collimation is generally required in the case of the inclinometers to date.

THE DRAWINGS

Embodiments of the invention are explained in more detail below, purely by way of example, with reference to the drawings.

Figure 1:
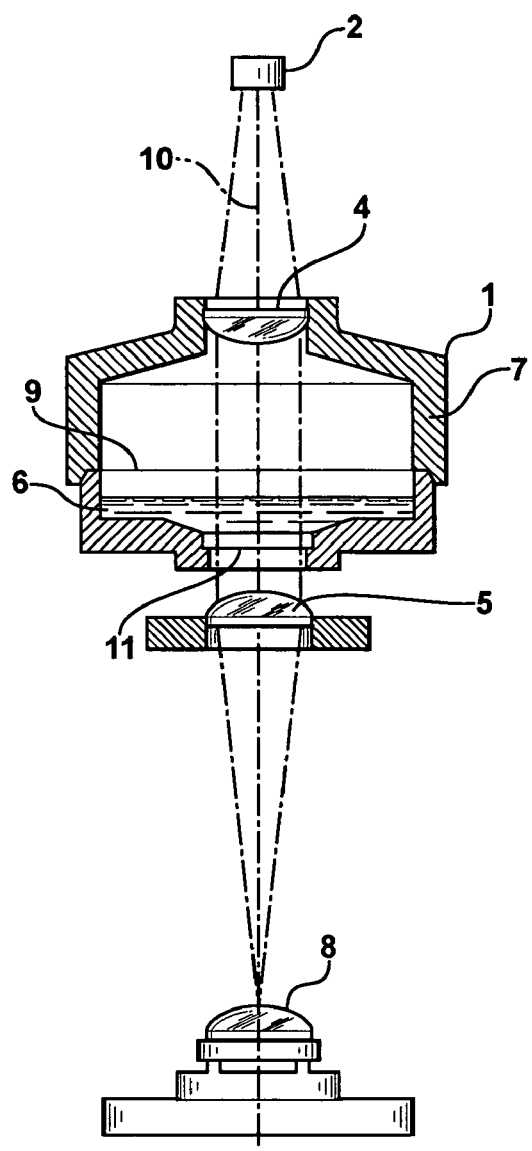
Figure 2:
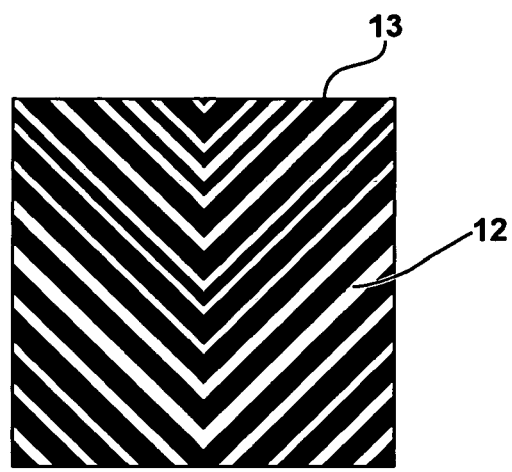
Figure 3:
Figure 4:
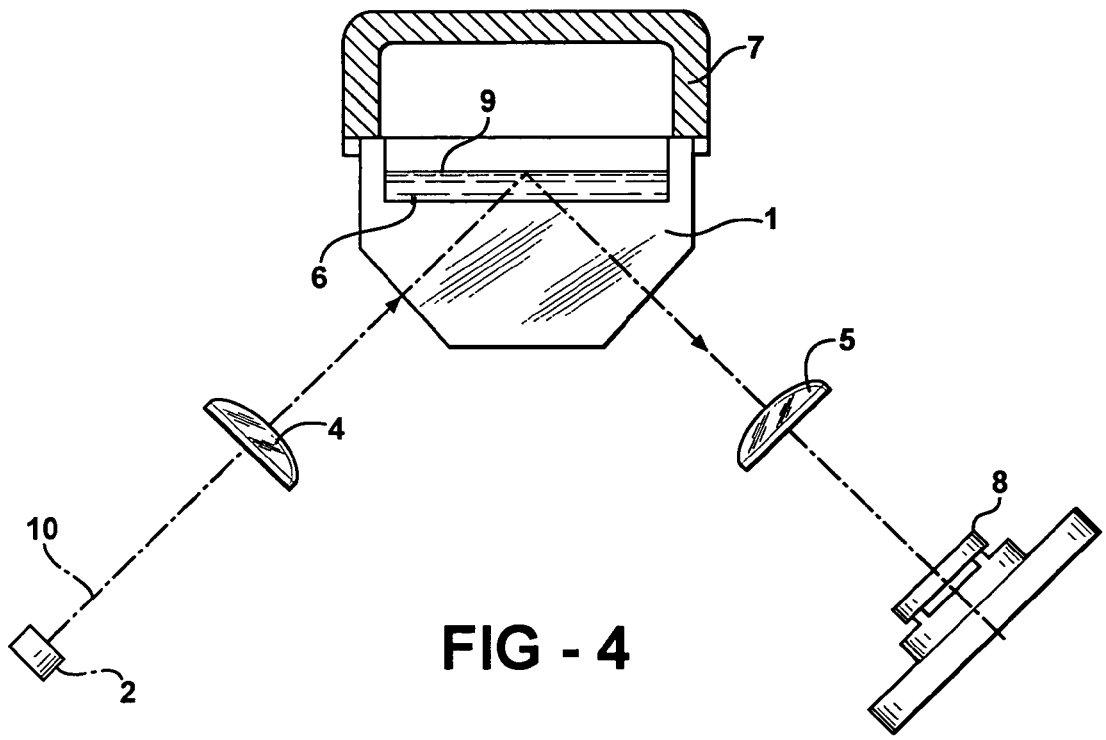

FIG. 1 schematically shows a measuring arrangement comprising a liquid prism in transmitted light, FIG. 2 schematically shows an example of a pattern on the LED surface, FIG. 3 schematically shows a second example of a pattern on the LED surface, and FIG. 4 schematically shows a measuring arrangement comprising a liquid prism and total reflection at the liquid horizon.

THE DISCLOSED EMBODIMENTS

The invention is shown purely by way of example for tilt sensors in FIG. 1 and FIG. 4 but—as is evident to the person skilled in the art—is also relevant in an adequate manner for angle sensors. FIG. 1 shows an arrangement for an inclinometer, which arrangement comprises, as a source 2 of optical radiation, a light-emitting diode (LED), the surface of which is provided with a pattern. The radiation beam generated by the LED is propagated or passes alone a path through the pattern and past the liquid prism 1, and impinges on the linear array 8, where an image of the pattern forms. The liquid prism 1 is conventional and consists firstly of a container 7 which contains a liquid 6, which is preferably silicone oil. The light passes alone the path via an upper lens 4 which parallelizes the pencil of rays into the interior of the container 7, traverses the liquid 6 and passes out again in the form of a beam 10 through a transparent end plate 11 closing the container 7. Thereafter, the beam is focused by a lower lens 5 and strikes the linear array 8 which is at a distance from the lens 5 which corresponds to the focal length of the lens.

The indication of the tilt utilizes the phenomenon of refraction, according to which the deviation of the beam and the resultant shift of the pattern relative to the linear array 8 depends on the angle which the beam and the plane of incidence—i.e. liquid horizon 9—make with one another.

FIG. 2 illustrates a pattern which is applied to the surface of the light-emitting diode (LED) and consists of substantially V-shaped lines 13 of different line thickness which are parallel to one another and spaced a distance apart, resulting in a herringbone design 12.

FIG. 3 shows a further example of a pattern formed from a first group of parallel straight lines 14 on the LED. The pattern contains a centrally arranged group of four lines 14 which are arranged parallel to one another and a distance apart and which are flanked on opposite sides by, in each case, a second group or pair of parallel lines 14a. The laterally arranged pairs of lines converge towards one another in one direction, resulting in an outer substantially V-shaped contour.

FIG. 4 shows an embodiment comprising a combined glass-liquid prism 1. As a result of total reflection, the light beam 10 experiences, at the liquid horizon 9, a deflection as it passes the prism which depends on the angle which the light beam 10 and liquid horizon 9 make with one another. Amplification of the reflection results from the fact that, on total reflection, a change in the angle of incidence, as is the case with a tilt of the liquid horizon 9 relative to the light beam, produces a deflection angle of twice the magnitude of the angle of incidence.

The patterns shown in FIGS. 2 and 3 are purely by way of example, and the pattern structure may have any desired design and may be applied to the surface of the light source in various ways, such as by being printed on, etched, scoring, applied by vapor deposition, etc.

The invention claimed is:

1. In a tilt sensor having a generating source of optical radiation for emission of a beam along a path, a pattern in said path and through which said beam from said source may pass, tilt-sensitive means in the path of said beam downstream of said pattern, and a projection area on which said beam may impinge following passage of said beam through said pattern and beyond said tilt sensitive means, the improvement wherein said pattern is applied directly to and carried by said source.

2. The tilt sensor according to claim 1 wherein said source is a light-emitting diode.

3. The tilt sensor according to claim 1 wherein said pattern is formed in such manner as to enable a two-dimensional tilt measurement to be obtained.

4. The tilt sensor according to claim 1 wherein said pattern is printed on said source.

5. The tilt sensor according to claim 1 wherein said pattern is etched on said source.

6. The tilt sensor according to claim 1 wherein said pattern is applied by vapor deposition on said source.

7. The tilt sensor according to claim 1 wherein said pattern is scored in said source.

8. The tilt sensor according to claim 1 wherein said beam is transmitted directly from said tilt-sensitive means to said projection area.

9. The tilt sensor according to claim 1 wherein said beam is transmitted from said tilt-sensitive means by reflection to said projection area.

10. The tilt sensor according to claim 1 wherein said pattern is in the form of spaced apart lines.

11. The tilt sensor according to claim 10 wherein said lines are in herringbone form.

12. The tilt sensor according to claim 10 wherein said lines are in V form.

13. The tilt sensor according to claim 10 wherein said lines are substantially parallel to one another.

14. The tilt sensor according to claim 10 wherein said pattern is formed by a first group of substantially parallel lines flanked by a second group of parallel lines.

* * * * *